(12) United States Patent
Nagareda et al.

(10) Patent No.: US 6,426,719 B1
(45) Date of Patent: Jul. 30, 2002

(54) POSITION MEASUREMENT APPARATUS THAT DETECTS LOCATION BY RECEIVING EXTERNAL SIGNALS

(75) Inventors: Hirofumi Nagareda, Tachikawa; Noriyuki Kitta, Tokyo, both of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/543,719

(22) Filed: Apr. 5, 2000

(30) Foreign Application Priority Data

Apr. 7, 1999 (JP) .......... 11-099625
Sep. 29, 1999 (JP) .......... 11-275746

(51) Int. Cl.7 .................... G01S 5/14
(52) U.S. Cl. .......... 342/357.06; 342/357.17; 340/573.1; 340/573.7
(58) Field of Search .......... 342/357.13, 357.12, 342/357.17, 357.07, 357.06; 340/573.1, 573.7

(56) References Cited

U.S. PATENT DOCUMENTS

| | | | | | |
|---|---|---|---|---|---|
| 5,627,548 | A | * | 5/1997 | Woo et al. | 342/357 |
| 5,781,155 | A | * | 7/1998 | Woo et al. | 342/357 |
| 5,905,460 | A | * | 5/1999 | Odagiri et al. | 342/357 |
| 5,926,131 | A | * | 7/1999 | Sakumoto et al. | 342/357 |
| 6,204,807 | B1 | * | 3/2001 | Odagiri et al. | 342/357.06 |

* cited by examiner

Primary Examiner—Michael J. Zanelli
Assistant Examiner—Eric M Gibson
(74) Attorney, Agent, or Firm—Frishauf, Holtz, Goodman & Chick, P.C.

(57) ABSTRACT

A position measurement apparatus comprises at receiving unit, control unit, and detection unit that detect the motion of device, the position of device, or wearing situation of device, and the timing of receiving information by the receiving unit is controlled by the control unit in accordance with the detection results by the detection unit.

7 Claims, 15 Drawing Sheets

FIG.4A

| SPECIFIED AREA DATA |
|---|
| A1 |
| A2 |
| A3 |
| ⋮ |
| An |

FIG.4B

| LOCUS DATA |
|---|
| B1 |
| B2 |
| B3 |
| B4 |
| ⋮ |
| Bn |

POSITION MEASUREMENT APPARATUS THAT DETECTS LOCATION BY RECEIVING EXTERNAL SIGNALS

CROSS-REFERENCE TO RELATED APPLICATIONS

This application is based upon and claims the benefit of priority from the prior Japanese Patent Applications No. 11-099625, filed Apr. 7, 1999; and No. 11-275746, filed Sep. 29, 1999, the entire contents of which are incorporated herein by reference.

BACKGROUND OF THE INVENTION

The prior art position measurement apparatuses using a GPS (Global Positioning System) that utilizes position measurement satellites measure the present locations by receiving navigation signals or position measurement information such as Ephemeris and Almanac. Ephemeris provides data denoting the orbit information of satellites and clock correction information whereas Almanac supplies data denoting the approximate orbit information of all GPS satellites. To receive the position measurement information, each satellite is acquired by synchronizing the data receiving timing to the data transmitting timing from the satellite, and the accuracy of positioning increases as the number of satellites that are acquired increases.

However, when the above-mentioned position measurement apparatus is incorporated in a portable device such as a wristwatch, the following problems occur. Since receiving position measurement information for the above-mentioned position measurement operation consumes much more electric power than the simple clock operation of the wristwatch, the life of batteries is shortened, which requires a greater capacity of battery and a larger size of the device deteriorating its portability.

The object of the present invention is to solve these problems and provide a position measurement apparatus of a smaller size with a longer life of batteries.

BRIEF SUMMARY OF THE INVENTION

One preferred embodiment of the present invention is a position measurement apparatus that detects location by receiving external signals, comprising:

a position measurement unit that receives position measurement information transmitted from satellites and measures the present location based on the information;

a timer that measures time;

a judging unit that judges whether the device is in a stationary condition for a specified period of time; and a control unit that ends a position measurement operation for the present location by the position measurement unit according to judgment made by the judging unit that the device has remained stationary for a specified period of time.

Another preferred embodiment of the present invention is a position measurement apparatus that detects location by receiving external signals, comprising:

a position measurement unit that receives position measurement information transmitted from satellites and measures the present location based on the information;

a memory unit that successively stores the present location measured by the position measurement unit; and a control unit that prohibit to store new present location data in the memory unit while the present location measured by the position measurement unit is outside a predetermined area.

Still another preferred embodiment of the present invention is a position measurement apparatus that detects location by receiving external signals, comprising:

a position measurement unit that receives position measurement information transmitted from satellites and measures the present location based on the information;

a memory unit to store a predetermined area; and a control unit that specifies the receiving interval of the position measurement unit for the position measurement information longer, if the present location measured by the position measurement unit is outside the area stored in the memory unit, than the interval applied to the area stored in the memory unit.

Yet another preferred embodiment of the present invention is a portable position measurement apparatus that can be worn by the user, comprising:

a position measurement unit that receives position measurement information transmitted from satellites and measures the present location based on the information;

a wearing situation detection unit to detect wearing situation by the user of the device; and a control unit that ends the measurement of the present location by the position measurement unit in accordance with the detection of non-wearing situation by the detection unit.

A further preferred embodiment of the present invention is a portable position measurement apparatus that can be worn by the user, comprising:

a position measurement unit that receives position measurement information transmitted from satellites and measures the present location based on the information;

a wearing situation detection unit to detect the wearing situation wherein the device is worn by the user; and a control unit that starts measuring the present location by the position measurement unit in accordance with the detection of wearing situation by the wearing situation detection unit.

In any of the above embodiments, it is possible to save the electric power consumption by the device without significantly affecting the convenience of use, and a longer life of batteries and a smaller size of the device are obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is a schematic diagram for the data stored in the RAM in the third embodiment of the present invention.

FIG. 4B is a schematic diagram for the data stored in the RAM in the third embodiment of the present invention.

DETAILED DESCRIPTION OF THE INVENTION

Embodiment 1

Figure 1A:
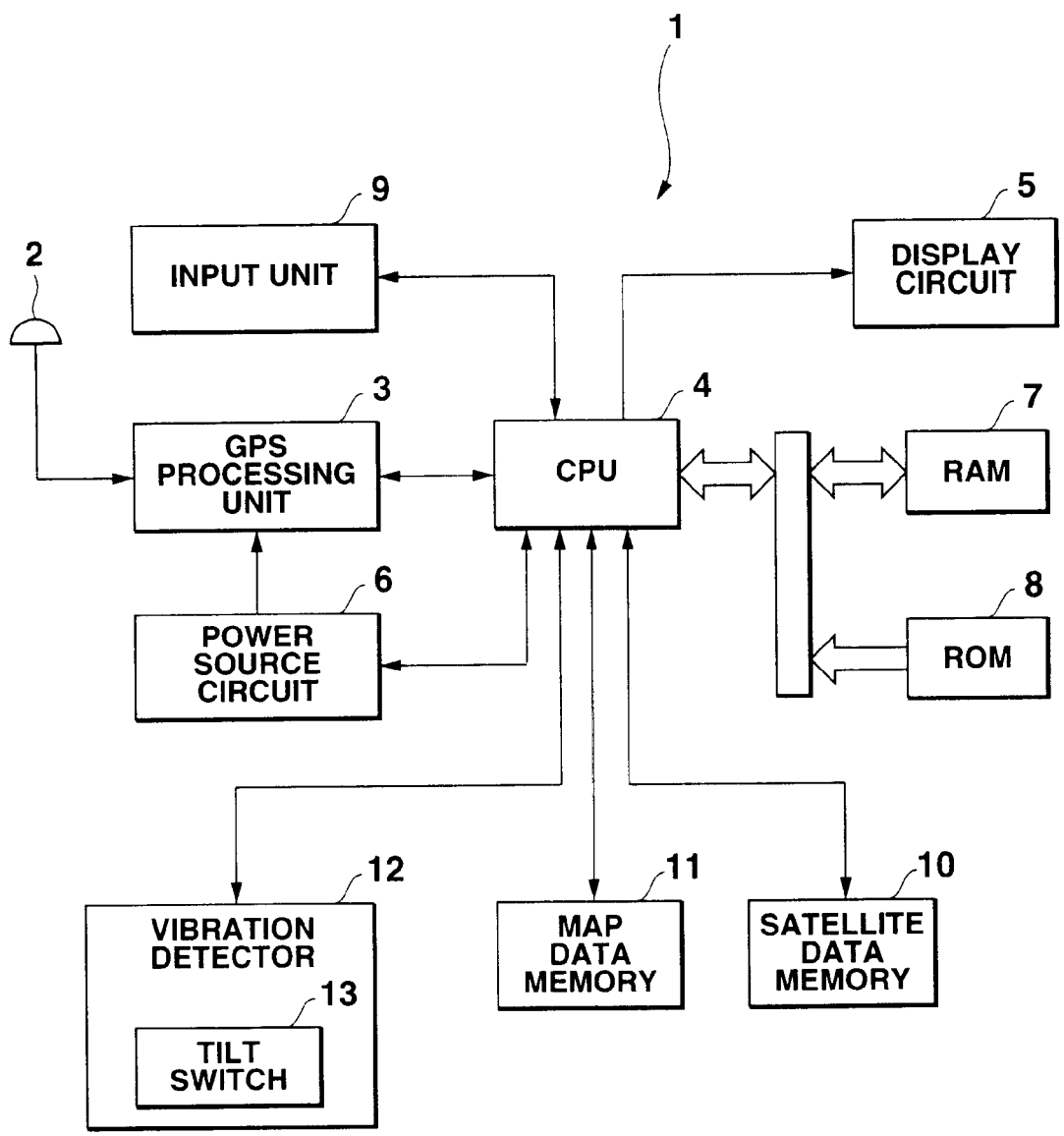
FIG. 1A is a block diagram of the position measurement apparatuses of the first to fifth embodiments of the present invention.
Figure 1B:
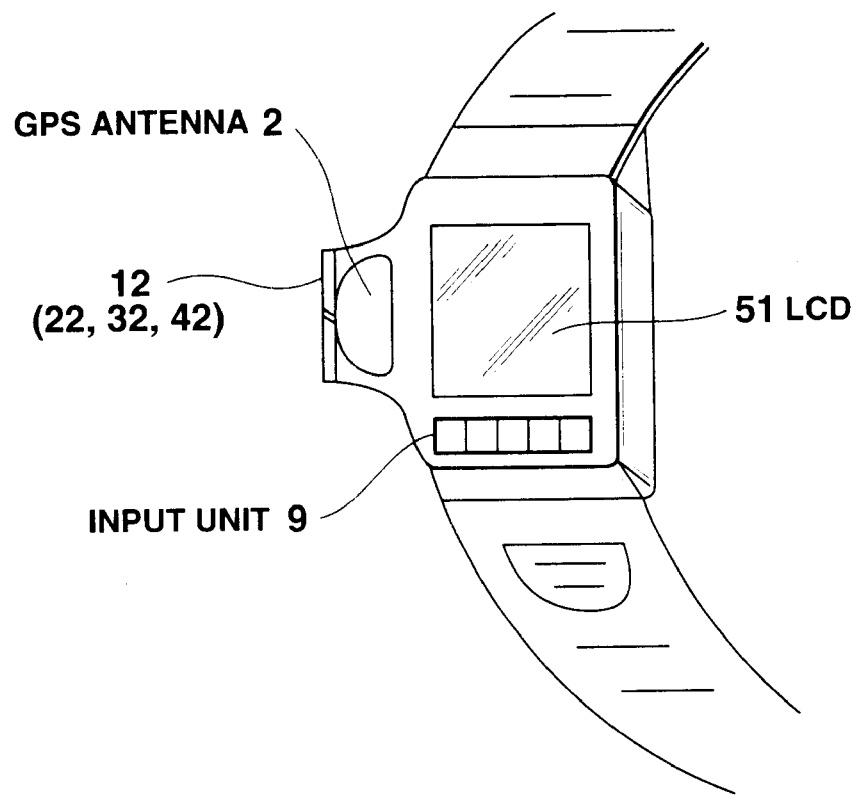
FIG. 1B is an outside view that is common for the first to fifth embodiments of the present invention having a shape of wristwatch.
Figure 1C:
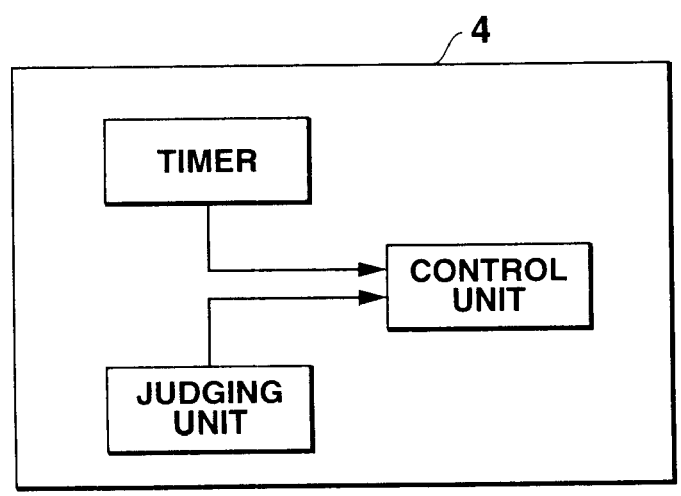
FIG. 1C is a functional block diagram that shows the internal functions of the CPU 4 illustrated in FIGS. 1A, 7, 10, and 13.

Referring now to the drawing GPS referred embodiments of the present invention will be described. FIG. 1A illustrates a block diagram of a position measurement apparatus 1 according to the present invention. FIG. 1B shows the outside perspective view of the position measurement apparatus 1 having a wristwatch-like shape. FIG. 1C is a functional block diagram illustrating the internal functions of the CPU 4 (central processing unit) shown in FIG. 1A, which includes at least a timer 41 for measuring the elapsed time, a judging unit 42 that makes various judgments, and a control unit 40 that controls the units composing the position measurement apparatus as well as the whole position measurement apparatus 1. However, it is not always necessary to install the timer 41 in the CPU 4, which may be externally installed to control the CPU 4.

This position measurement apparatus 1 has a wristwatch-like shape that can be fastened around the user's wrist, having a GPS antenna 2 and GPS processing unit 3. The GPS processing unit 3 comprises RF (radio frequency) signal processor, A/D (analog/digital) converter, data register, counter, decoder, GPS control circuit that controls these operations, ROM (read only memory), and RAM (random access memory).

The GPS processing unit 3, after amplifying and demodulating the electric waves of L1 band transmitted from the GPS satellites and received by the GPS antenna 2, decodes the satellite data such as Ephemeris information and Almanac information, and measures the location by determining own position based on the decoded data.

The resultant data of calculation by the GPS processing unit 3 are sent to the CPU 4 that controls the whole position measurement apparatus 3, and displayed on the LCD 51 (liquid crystal display) connected to the display circuit 5. When the normal clock mode is set, the present time is sent to the CPU 4 from the clock (not shown) and displayed on the LCD 51. When the GPS mode is set, the present location or latitude/longitude measured by the GPS processing unit 3 is displayed. Electric power is supplied to the GPS processing unit 3 and CPU 4 by the power source circuit 6 including batteries. The CPU 4 is operated by the programs stored in the ROM 8 with the ROM 7 being used as the working memory, and controls each part of the device including the GPS processing unit 3. Data related to the controlling of CPU 4 are stored in the above-mentioned RAM.

To the CPU 4 are connected the switch input unit 9 to which a plurality of switches for changing over between the clock mode and GPS mode, satellite data memory 10, map data memory 11, and vibration detector 12. The satellite data memory 10 is a non-volatile memory such as EEPROM (electrically erasable and programmable ROM) for storing the satellite data including Ephemeris information and Almanac information that are read or renewed by the GPS processing unit 3. The map data memory 11 is a ROM in which unchangeable data such as map data and position measurement system data are stored. The vibration detector 12 is provided with a tilt switch 13 that detects the change of tilt or vibration of the device, and the detection signals from the tilt switch 13 are processed in the vibration detector 12 and sent to the CPU 4.

Figure 2:
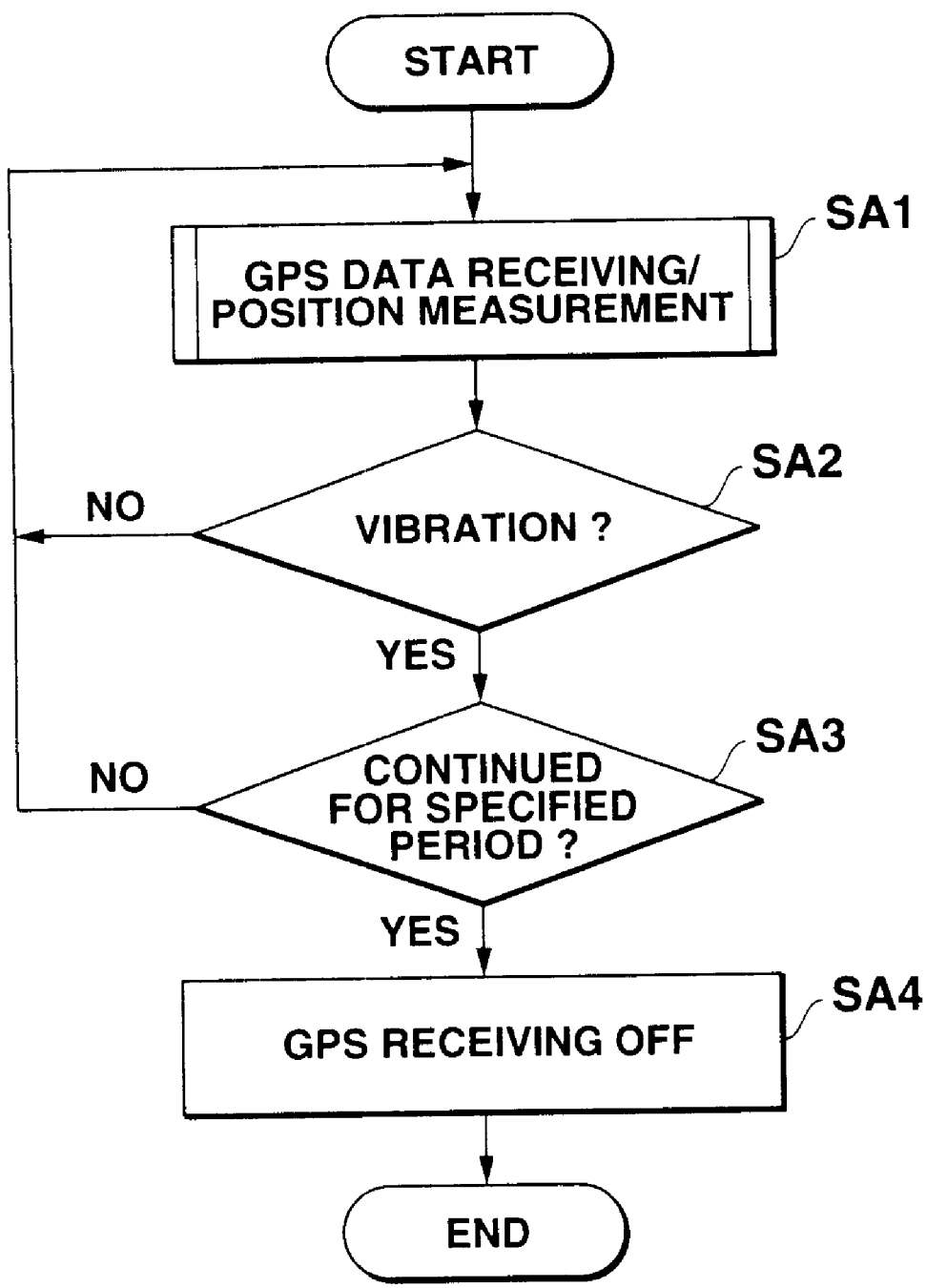
FIG. 2 is a flow chart showing the operation in the GPS mode of the first embodiment of the present invention.

Referring now to the flow chart of FIG. 2 that illustrates the processing procedure of CPU 4, the operation in the GPS mode of the position measurement apparatus 1 having the above-mentioned constitution will be described.

When the GPS mode is set, the CPU 4 receives the position measurement information through the GPS processing unit 3, and measures the present location, then displays the measurement result (latitude/longitude) on the LCD 51 of display circuit 5 (step SA1). Then it is judged whether the device is tilted based on the detection signals from the tilt switch that are transmitted from the vibration detector 12 (step SA2); the operation returns to step SA1 if the result is NO indicating vibration has been detected. If the result of judgment is YES indicating no vibration, it is judged whether the situation has continued for a predetermined period of time (step SA3). Time information related to the instance of the situation change from the one in which vibration is detected to the one in which vibration is not detected is stored (or renewed) in the RAM 7 by the CPU 4 provided with a timer function; and the judgment is made, for instance, by checking whether the difference between the time information stored in the RAM 7 and the time information at the instance of the judgment exceeds a specified period of time. If the judgment of step SA3 is NO and the specified time has not elapsed, the operation returns to step SA1; if the specified time has elapsed, the position measurement operation by the GPS processing unit 3 is ended (step SA4) finishing the GPS mode.

In the GPS mode, therefore, when the situation wherein the position measurement apparatus 1 does not vibrate for a certain period of time indicating that the user wearing the position measurement apparatus does not move for a certain period of time, the GPS processing unit 3 stops, thereby eliminating the useless position measurement operation. By eliminating the useless position measurement operation, the electricity consumption is reduced resulting in a longer life of batteries and, consequently, a smaller size of the device.

Although the GPS mode is so arranged that it immediately ends when the position measurement apparatus 1 does not vibrate for a certain period of time in this embodiment, it is also possible to arrange the device so that when such a situation occurs, the position measurement apparatus stops temporarily but the detection of vibration is continued at certain intervals, and the position measurement operation resumes if vibration is detected. This is convenient because the user does not need to reset the GPS mode when he or she stays unmoved for a certain period of time and starts moving again.

Embodiment 2

Figure 3:
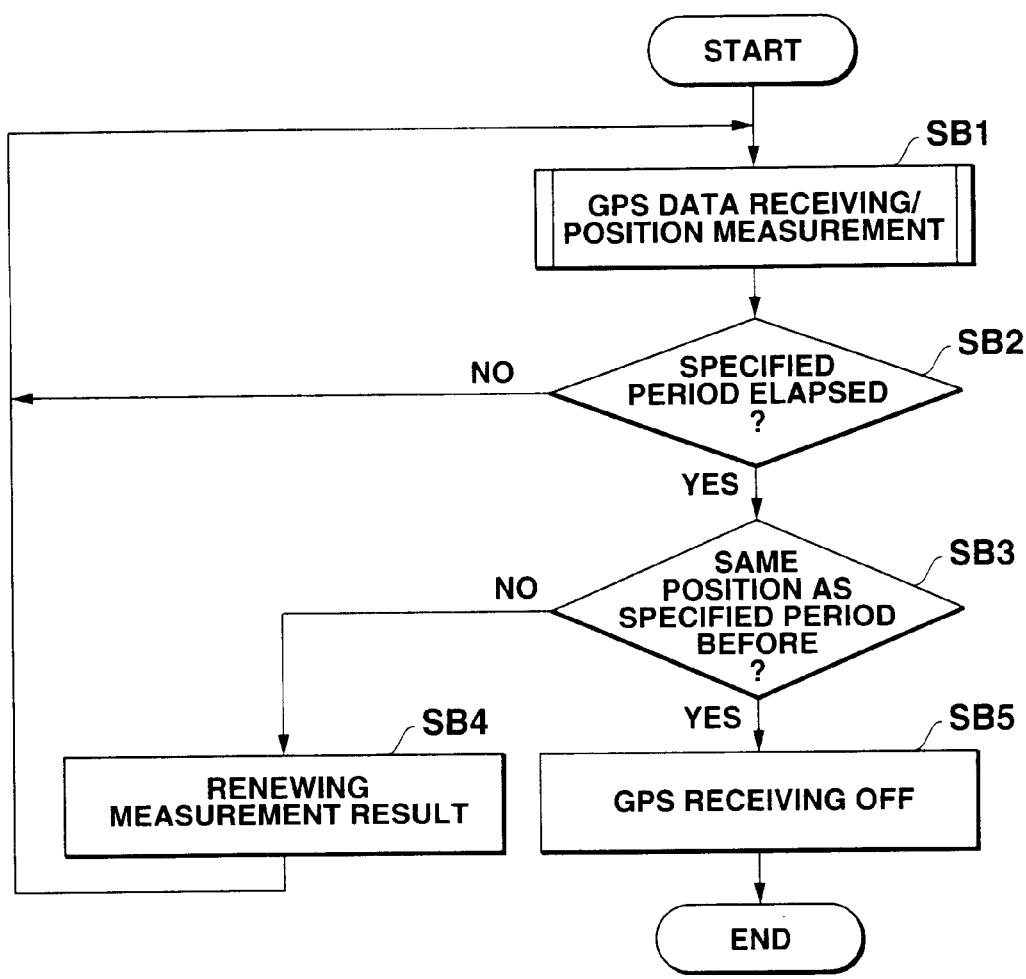
FIG. 3 is a flow chart showing the operation in the GPS mode of the second embodiment of the present invention.

Relative to the second embodiment of the present invention, FIG. 3 shows the flow chart of the processing procedure of CPU 4 when the GPS mode is set in the position measurement apparatus having the same constitution as shown in FIG. 1. However, the vibration detector mentioned above is not needed.

When the GPS mode is set, the CPU 4 starts position measurement using the GPS processing unit 3. The CPU 4 measures the present location by receiving the position measurement information and displays the measurement result (latitude/longitude) on the LCD 51 of display circuit 5 (step SB1), and judges whether the predetermined time has elapsed (step SB2). The initial elapsed time here is the time elapsed from the beginning of the position measurement operation. If the predetermined time has not elapsed, the operation returns to step SB1 and the position measurement operation is resumed by the GPS processing unit 3. When the elapsed time equals the predetermined time later, with the judgment of step SB2 being YES, it is judged whether the present location measured at the instance is identical to the position measurement results that were measured the predetermined time before and stored in the RAM 7 (step SIB). The first judgment after starting the position measurement is NO and the operation proceeds to step SB4 to store the position measurement result at that instant in the RAM 7, and returns to step SB1. That is, the position measurement results at intervals of predetermined period of time are stored in the RAM 7 in step SB4 renewing the data. After repeating the above-mentioned procedure, when both judgments of step SB2 and step SB3 are YES indicating that the present location is identical to the one obtained by the measurement a predetermined period of time before, the positioning operation by the GPS processing unit 3 stops (step SB5) and the GPS mode ends.

Thus in the GPS mode, the useless operation of the GPS processing unit 3 is eliminated when the user wearing the position measurement apparatus 1 does not move for a period longer than a predetermined period of time. Therefore, the power consumption is reduced in this embodiment also by eliminating the useless operation of position measurement, which results in a longer life of batteries and a smaller size of the device. Furthermore, compared to the first embodiment, this embodiment provides more precise information of the movement of the user so that the useless operation can be eliminated more effectively.

Embodiment 3

The third embodiment of the present invention will be now described. According to this embodiment, the position measurement apparatus having the same constitution as shown in FIG. 1 is provided with the predetermined area data area 7a illustrated in FIG. 4A and the locus data area illustrated in FIG. 4B, and also provided with the locus data storage mode wherein the present location is consecutively measured and the obtained location data (latitude/longitude) are consecutively stored in the locus data area 7b as locus data that represent the locus movement. The above-mentioned vibration detector is not needed for this embodiment also.

Figure 5:
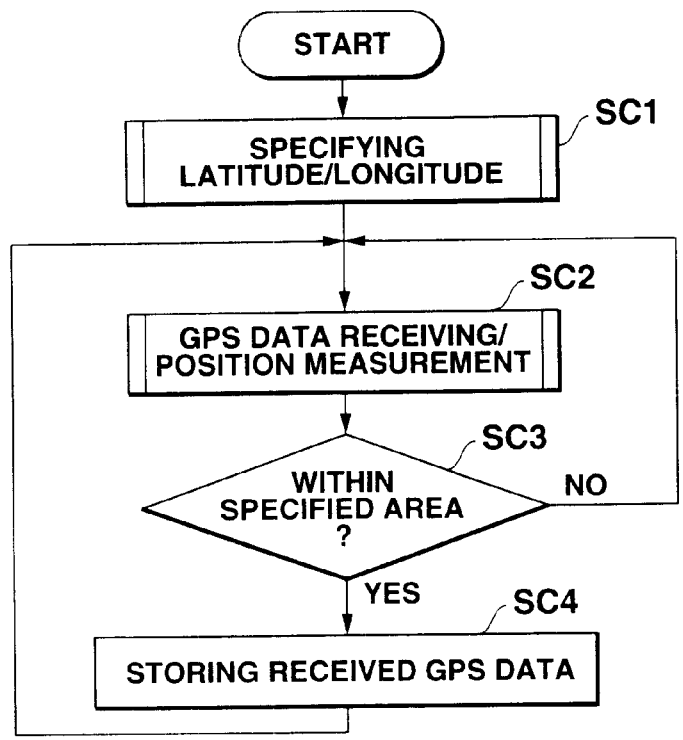
FIG. 5 is a flow chart showing the operation in the orbit data storage mode in the third embodiment of the present invention.

Referring to the flow chart of FIG. 5 in accordance with this embodiment, the operation in the above-mentioned locus data storage mode is as follows. When this mode is set, the system requests the user to specify desired latitude/longitude, and such specified latitude/longitude data, A1, A2 ... An, are stored sequentially in the predetermined area data area 7a (step SC1). The number of sets of latitude/longitude that are specified by the user here is three or more. Then the GPS processing unit 3 starts the position measurement operation receiving the position measurement information and measuring the present location and the measurement results (latitude/longitude) are displayed on the LCD 51 of display circuit 5 (step SC2). Then it is judged whether the measured location is within the area expressed by the latitude/longitude data, A1, A2 . . . An, stored in the above-mentioned predetermined area data area 7a, that is, within the area surrounded by the lines connecting the points expressed by these data (step SC3). If the location is within the predetermined area, the measurement result is stored in the locus data area 7b as locus data (step SC4), then the operation returns to step SC2; if the judgment of step SC3 is NO indicating that the measured location is outside the above-mentioned area, the operation directly returns to step SC2. These steps are repeated until the locus data storage mode ends.

In this embodiment, therefore, useless storing of the locus data is eliminated when the user is outside the area wherein the storage of the locus data is not required. This reduces the number of storing operation for the locus data resulting in a longer life of batteries and a smaller size of the device. Further, the storage capacity of the RAM 7 is effectively utilized.

Although the user is requested to specify three or more sets of latitude/longitude in this embodiment, it is also possible to define the area for the process to proceed to step SC2 by specifying a set of latitude/longitude as the center of the area and a radius of the area (or separately predetermined area), or to define the area for the process to proceed to the above-mentioned step SC2 by specifying two sets of latitude/longitude that form the diagonal of a rectangle area. It is further possible not to rely on latitude/longitude but to display a simple map based on the map data stored in the map data memory 11 on the LCD 51 and to specify the desired points on the simple map by the specified switch operation and store the latitude/longitude of that point in the predetermined area data area 7a of RAM 7. If a plurality of these specifying methods are available, the device will be more convenient for the user.

Embodiment 4

Now the fourth embodiment of the present invention will be described. According to this embodiment, the position measurement apparatus that has identical constitution as shown in FIG. 1 is provided with the predetermined area data area 7a as shown in FIG. 4A in the memory of RAM 7. The above-mentioned vibration detector 12 is not required for this embodiment also.

Figure 6:
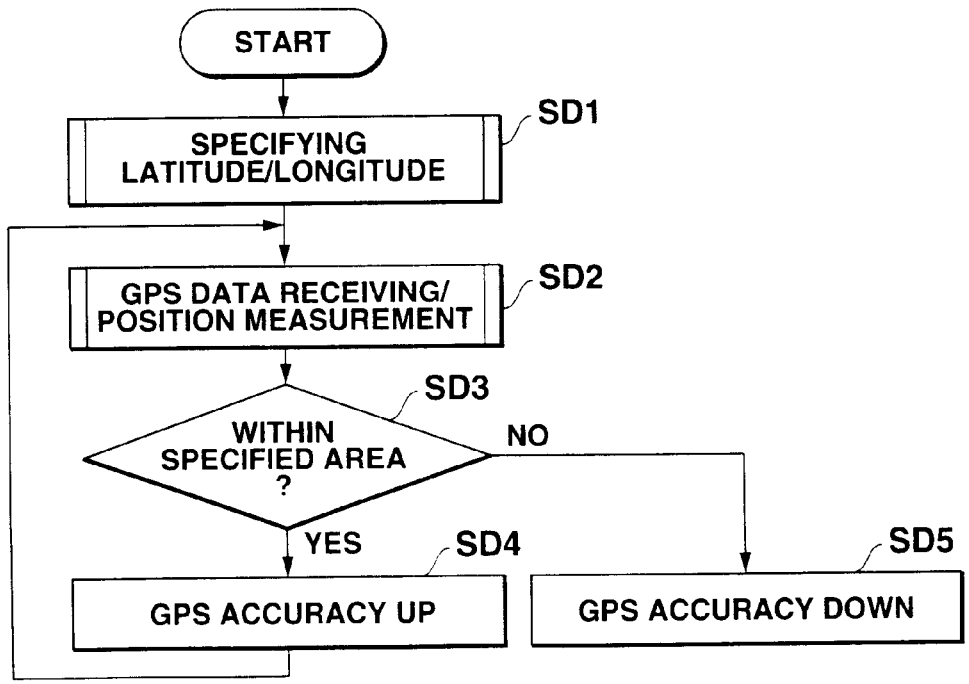
FIG. 6 is a flow chart showing the operation in the electricity-saving mode in the fourth embodiment of the present invention.

Referring to the flow chart of FIG. 6, the operation in the GPS mode in this embodiment is as follows. When this mode is set, the user is requested to specify desired latitude/longitude, and the specified latitude/longitude data, A1, A2.

An, are sequentially stored in the predetermined area data area 7a (step SD1). Here, three or more sets of latitude/longitude are specified by the user. Then the GPS processing unit 3 starts the position measurement operation by receiving the position measurement information and measuring the present location, and the measurement result (latitude/longitude) is displayed on the LCD 51 of display circuit 5 (step SD2). Then it is judged whether the measured point is within the area defined by the latitude/longitude data, A1, A2. An, stored in the above-mentioned predetermined area data area 7a, that is, within the area surrounded by the lines connecting the points expressed by these data (step SD3).

If the point is within the predetermined area, the time interval of position measurement operation of the GPS processing unit 3 is set to "short" to increase the position measurement accuracy (step SD4), and the operation returns to step SD2. According to this embodiment, two levels of time intervals for position measurement, long and short, are provided; when the "short" interval is set for the time interval of position measurement operation in step SD4, the set time interval is retained as it is. If, conversely, the judgment in step SD3 is NO indicating that the measured location is outside the above-mentioned predetermined area, the time interval of position measurement operation by the GPS processing unit 3 is set to "long" to decrease the position measurement accuracy (step SD5), and the operation returns to step SD2. When the time interval of position measurement operation is already set to "long" at this point, the time interval that has been set is retained as it is. These steps are repeated until the GPS mode ends.

Thus, according to this embodiment, when the user is outside the area wherein position measurement of high accuracy is required, the time interval of position measurement operation is prolonged so that the power consumption by the position measurement operation is decreased in such area resulting in a longer life of batteries and a smaller size of the device.

Although the user is requested to specify three or more sets of latitude/longitude in this embodiment also, other methods as described in the third embodiment may be used to specify the area wherein position measurement of high accuracy is required.

In the third and fourth embodiments, the user is requested to specify a desired area in advance so that the necessity of storing locus data or time interval of position measurement operation can be regulated. As an extension, it is possible to store area data that specify an area where significant error in the measured location based on the position measurement information is expected due to poor receiving conditions for the position measurement information arising from the geographical features, etc., and to perform the above-mentioned operation by defining the area expressed by the stored area data as the predetermined area. By doing so, storage of useless locus data that does not reflect the actual movement of the device is eliminated in the third embodiment, and the number of position measurement operation with low accuracy is decreased in the fourth embodiment, so that the life of batteries is effectively prolonged.

Embodiment 5

Figure 7:
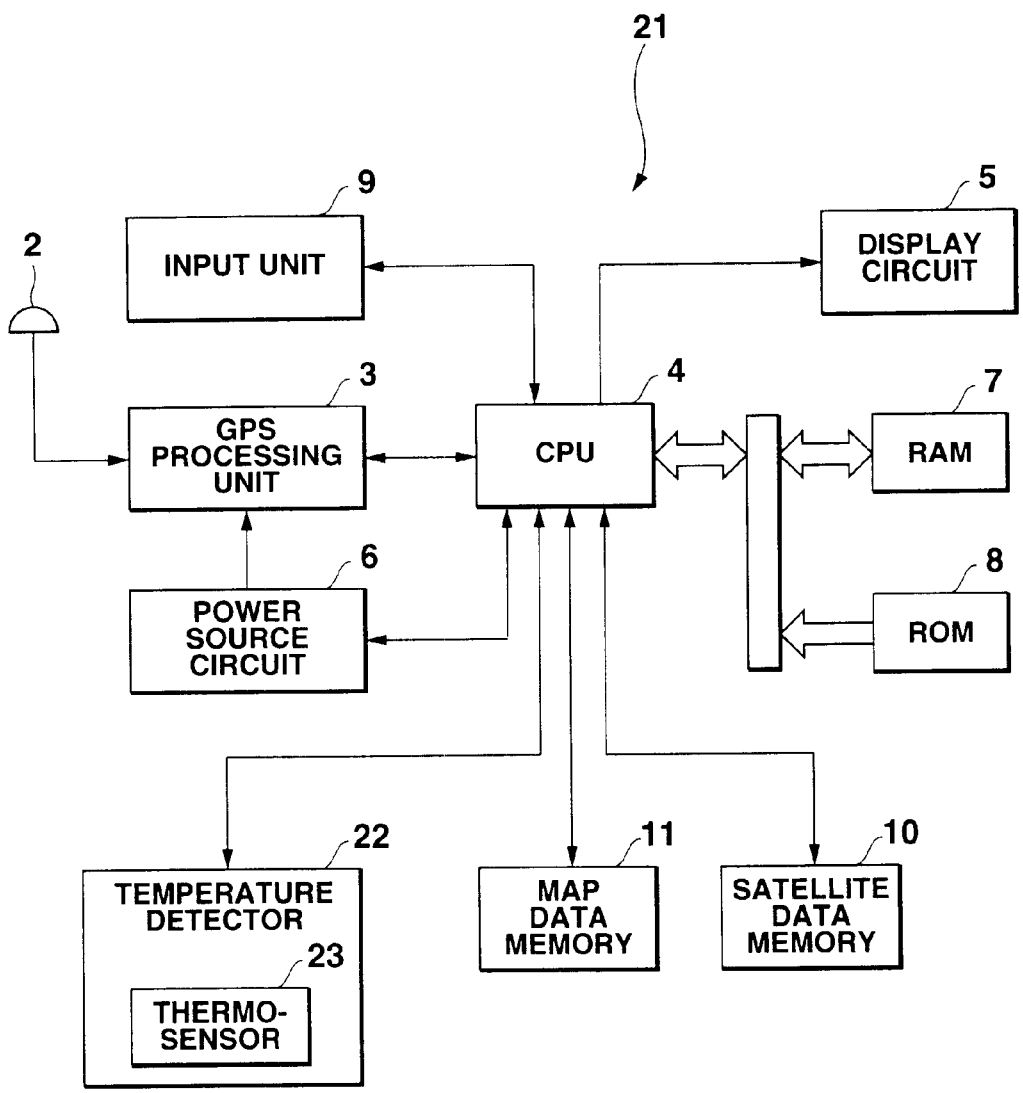
FIG. 7 is a block diagram of position measurement apparatus of the fifth embodiment of the present invention.

According to the fifth embodiment of the present invention, FIG. 7 is a block diagram illustrating the position measurement apparatus of a wristwatch-type that can be fastened around the user's wrist in the same way as outlined in FIG. 1. To describe the difference from the one shown in FIG. 1, this position measurement apparatus 21 is provided with a temperature detector 22 instead of the vibration detector 21. The temperature detector unit 22 is the main body of the position measurement apparatus 21 (not shown), having a thermo-sensor 23 located in a place that contact the user's wrist when worn by the user on the back side of the back cover in this embodiment. The detection signals from the thermo-sensor 23 is processed and transmitted to the CPU 4. The LCD 51 (not shown) of the display circuit 5 can display a simple map of the present location in addition to time and latitude/longitude. Except for these features, the device is identical to the one shown in FIG. 1.

Figure 8:
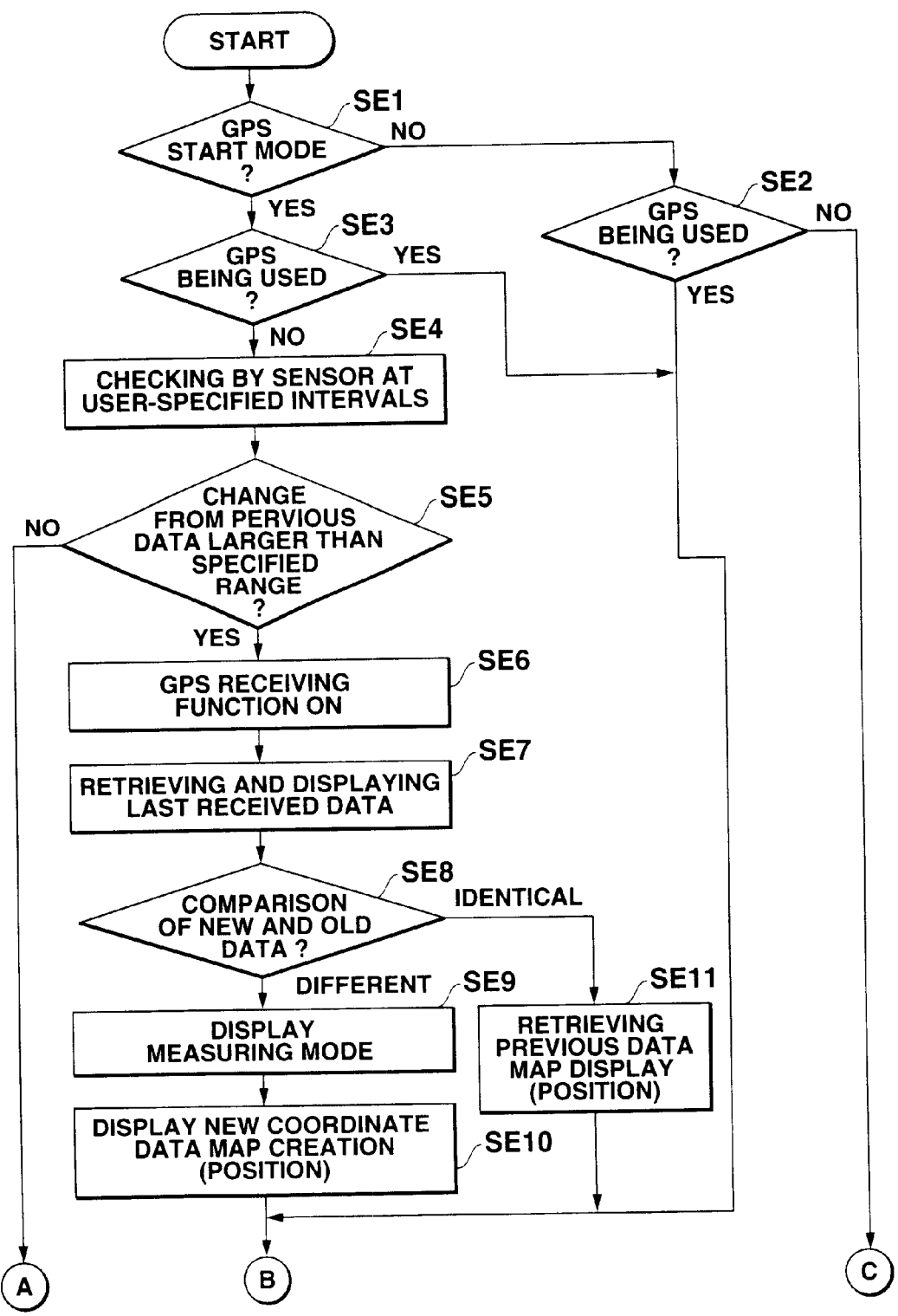
FIG. 8 is a flow chart showing the operation of the position measurement apparatus in the fifth embodiment of the present invention.
Figure 9:
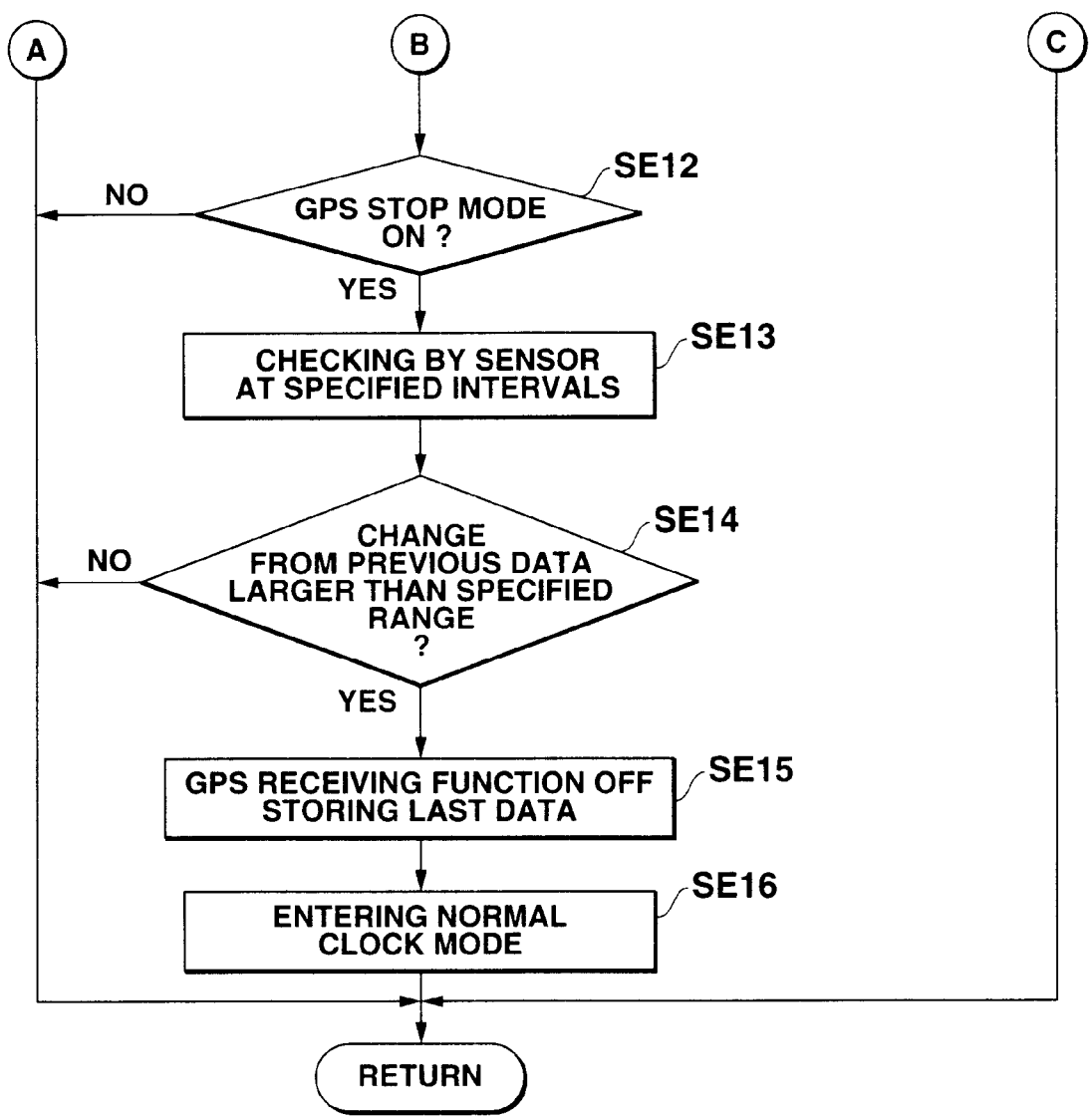
FIG. 9 is a flow chart continuing to the flow chart of FIG. 8.

The position measurement apparatus 21 is provided with the GPS mode wherein the present location is consecutively measured at constant intervals (for example, 1 minute or 1 second) and the measurement results are consecutively displayed, the GPS start mode that automatically sets the GPS mode, and the GPS stop mode that automatically ends the GPS mode, each mode being set or canceled by the user as required. The position measurement apparatus 21 operates as shown in the flow chart of FIGS. 8 and 9 with the CPU 4 controlling each unit, according to the setting of the above-mentioned modes, based on the programs stored in the ROM 8 of CPU 4.

If neither the GPS start mode nor GPS stop mode is set and position measurement is not being performed (both step SE1 and step SE2 are NO), the existing situation (time display in the clock mode in this embodiment) is continued, if the position measurement is being performed in the GPS mode (step SE1 is NO, step SE2 is YES, and step SE12 is NO), the position measurement operation is continued.

On the other hand, if the GPS start mode is set (step SE1 is YES) and the position measurement is being performed (step SE3 is YES), setting of the GPS stop mode is checked. If the GPS stop mode is not set (step SE12 is NO), time display in the clock mode is continued. If the GPS start mode is set and position measurement is not being performed (step SE3 is NO), temperature is checked using a temperature sensor at intervals predetermined by the user (step SE4), and it is judged whether the temperature change from the previous measurement result is longer than the specified value (step SE5). The previous measurement here refers to the temperature data that have been stored in the RAM every time the situation is checked. If the temperature change is less than the predetermined range, the operation directly returns to step SE1, if the temperature change is larger than the predetermined range (step SE5 is YES), power is supplied to the GPS processing unit 3 starting the position measurement (step SE6). That is, the GPS mode is canceled when the device is removed from the user, and then when the devices is worn by the user again, it is detected by the temperature change of the device (back lid) of more than a certain range (a temperature rise for example), and the GPS mode is automatically entered.

After the GPS mode is entered, the last location data of the previous position measurement is retrieved and displayed (step SE7), and the retrieved location data and the data obtained by the new position measurement operation are compared (step SE8). If these location data are identical, the measuring mode is displayed (step SE9), coordinate data of the simple map that display the simple map showing the present location is newly created and the new simple map is displayed on the LCD 51 of the display circuit 5 (step SE10). If the two data are identical in step SE8, the last coordinate data created by the previous position measurement operation are retrieved from the RAM 7 to display the MAP (step SE11).

After displaying the simple map by the above-mentioned operation, or when step SE2 or step SE3 is YES and the position measurement operation is being performed, it is judged whether the GPS stop mode is set (step SE12). If the GPS stop mode is not set, the operation returns to step SE1 as described above. If the GPS stop mode is set (step SE12 is YES), on the other hand, temperature is checked by the thermo-sensor 23 at intervals of predetermined period of time (step SE13) and it is judged whether there is a temperature change from the previous result larger than the specified value (step SE14). However, this judgment is skipped during a certain period immediately after the GPS mode is set in step SE6. If there is no temperature change larger than the specified range (step SE14 is NO), position measurement is continued. If the temperature change exceeds the specified range, the power supply to the GPS processing unit 3 is disconnected ending position measurement operation (step SE15). That is, when the device is removed from the user's wrist with a temperature change of the device (back lid) being larger than the specified range (temperature decrease for example), it is detected that the device has been removed, and the GPS mode is automatically canceled. After returning to the normal clock mode (step SE16), the operation returns to step SE1 and repeat the above-mentioned steps. During the above-mentioned procedure, the user can start or end position measurement in the GPS mode by the specified operations.

Thus, in the position measurement apparatus 21 of this embodiment, the GPS mode is automatically canceled when the user removes the device eliminating the useless measuring operation in the situation wherein position measurement is not necessary, permitting a longer life of batteries and a smaller size of the device. When the user wears the device, position measurement in the GPS mode automatically starts for the convenience of the user.

Although the device that has been described in this embodiment automatically ends the GPS mode when removed from the user, it is also possible to arrange the constitution so that position measurement automatically start when it is worn by the user but does not automatically end when removed. In this constitution, such a situation can be avoided wherein the user does not cancel the GPS mode after he or she removes the position measurement apparatus 21 to avoid the trouble of resetting the GPS mode causing useless operation while the positioning is not required. That is, the useless measuring operation is eliminated by encouraging the user to end the GPS mode when he or she removes the position measurement apparatus 21. This results in a longer life of batteries when batteries are used for the power source and a smaller size of the device. In this embodiment, because the wearing situation and non-wearing situation can be accurately detected based on the temperature change in the specified period, malfunction can be reliably avoided.

Although the thermo-sensor 23 is provided on the back lid of the device in this embodiment, it is also possible to mount it in other places that are sensitive to the user's temperature such as the inside of the watchband. In the embodiment mentioned above, the GPS mode starts or ends based on the temperature detected by the back lid. However, when the device is used in a very cold place and the user's temperature is extremely low, it is expected that immediate detection of the temperature change is not possible. In such a case, thermo-sensor 23 may be provided on both the back lid and front side separately. Then the GPS mode can be set or canceled based on whether the temperature difference between the backside and front side exceeds the specified range, enabling the detection of the wearing situation and non-wearing situation in the above-mentioned cold condition. At the same time, the accuracy of detection in the normal condition is improved by this constitution.

Figure 10:
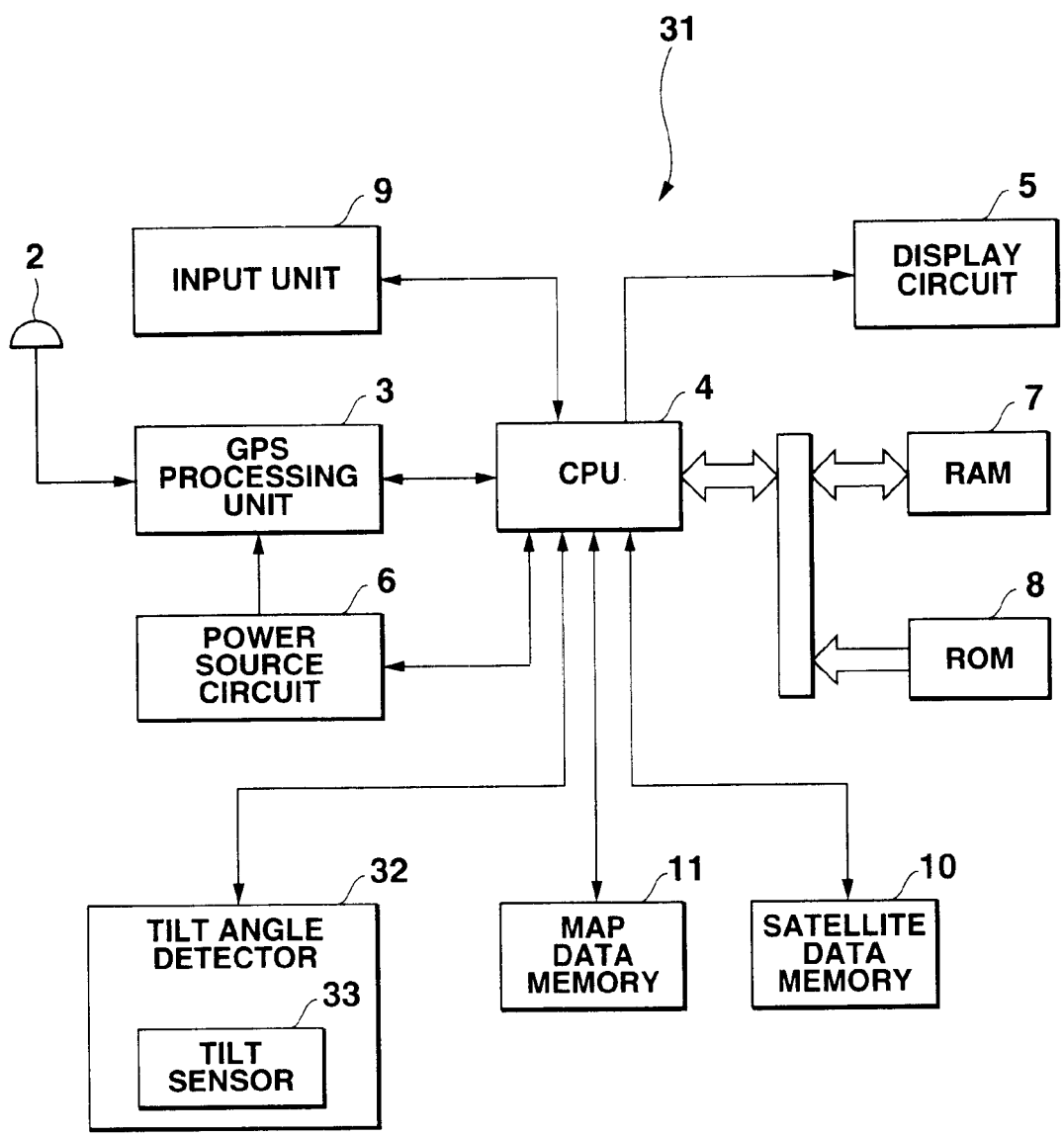
FIG. 10 is a block diagram of position measurement apparatus of the fifth embodiment of the present invention.

Now the sixth embodiment will be described. FIG. 10 is a block diagram of a wristwatch-type position measurement apparatus 31 that can be fastened around the user's wrist in the same way as outlined in FIG. 1. Different features from FIG. 1 are as follows. This position measurement apparatus 31 is equipped with a tilt angle detector 32 instead of the vibration detector 12. The tilt angle detector 32 is provided with a tilt sensor 33, and the detection signals from the tilt sensor 33 is processed and sent to the CPU 4. Unlike the tilt switch 13 described in the first embodiment, the tilt sensor 32 can detect tilt angles in a specified direction being used to detect the degree of tilting (posture) of the position measurement apparatus 31 (not shown). On the LCD 51 of display circuit 5, can be displayed a simple map of the present position in addition to time and latitude/longitude. Except for these features, the device is identical to the one shown in FIG. 1.

Figure 11:
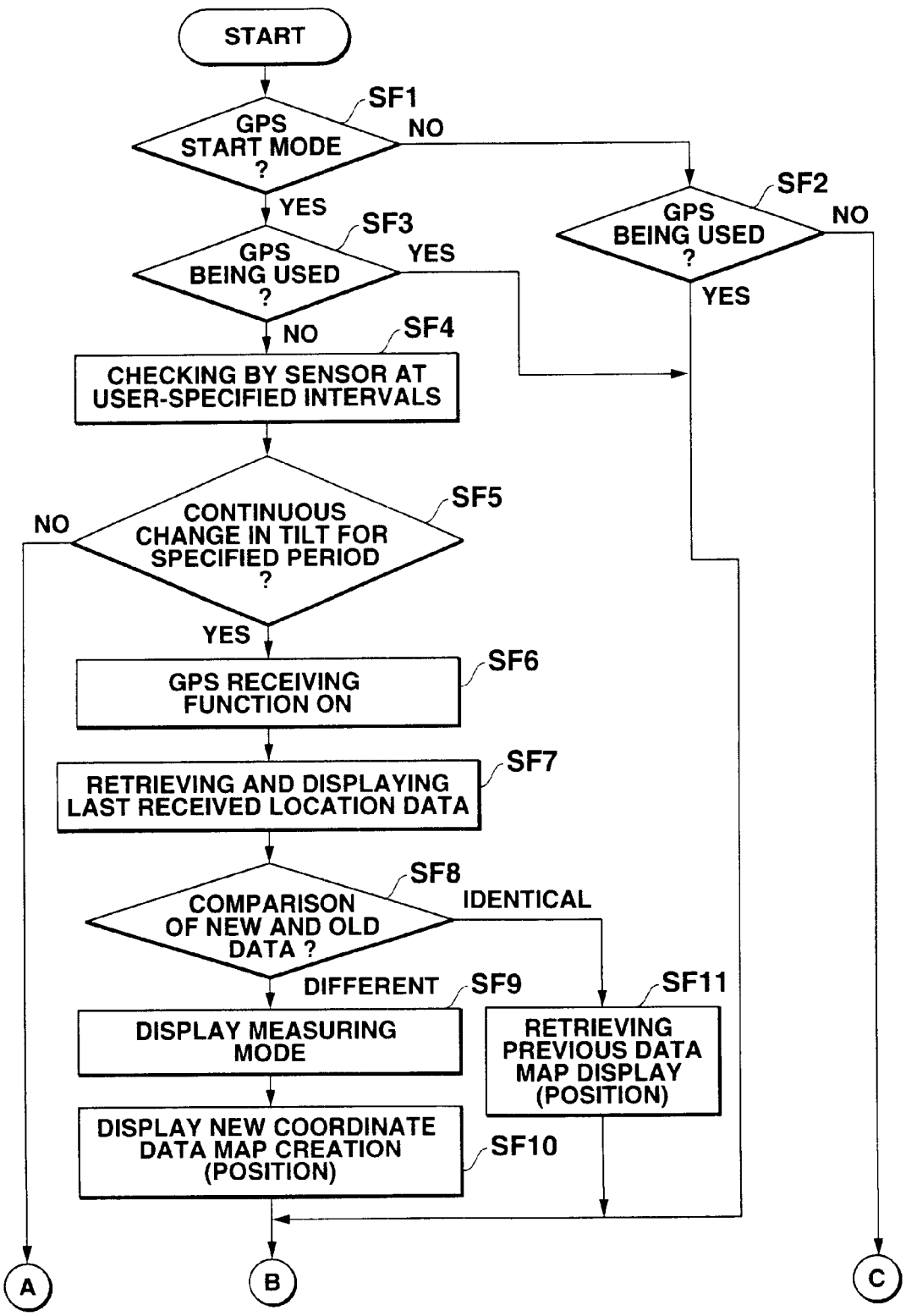
FIG. 11 is a flow chart showing the operation of the position measurement apparatus in the sixth embodiment of the present invention.
Figure 12:
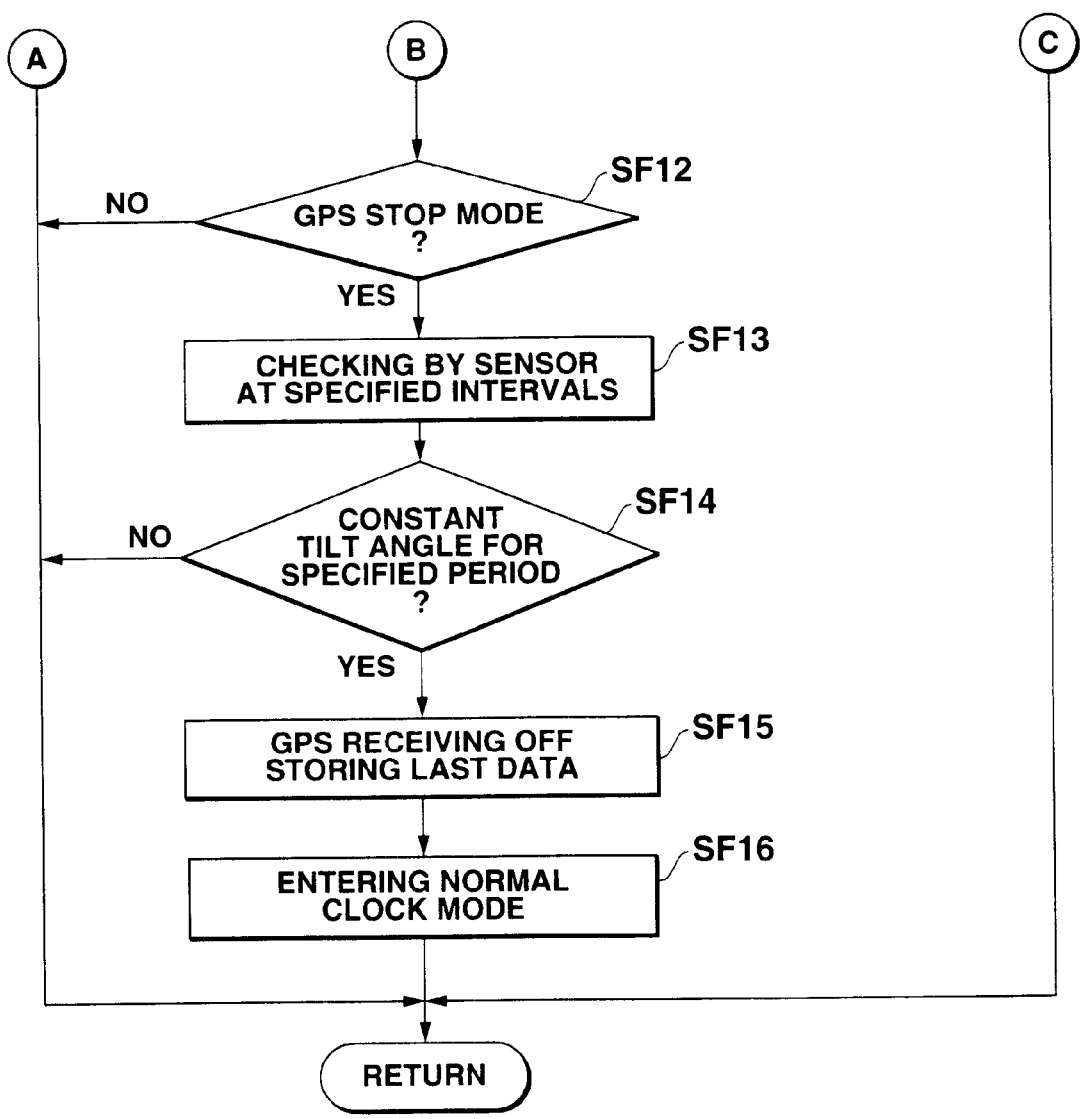
FIG. 12 is flow chart continuing to the flow chart of FIG. 11.

In the same way as described in the fifth embodiment, the position measurement apparatus 31 is provided with the GPS mode wherein the present location is consecutively measured at intervals of a certain period of time (for example, 1 minute or 1 second), the GPS start mode that automatically set GPS mode, and the GPS stop mode that automatically ends the GPS mode, each mode being able to be set or canceled by the user as required. The position measurement apparatus 31 operates as shown in the flow chart of FIG. 11 and FIG. 12 with the CPU 4 controlling each unit according to the set conditions of each mode based on the programs stored in the ROM 8.

When neither the GPS start mode nor the GPS stop mode is set (both step SF1 and step SF2 are NO), and if the position measurement operation in the GPS mode is not being performed, the existing situation (time display in the clock mode in this embodiment) is continued, if the position measurement operation is being performed (step SF1 is NO, step SF2 is YES, and step SF12 is NO), position measurement is continued.

When the GPS mode is set (step SF1 is YES) and position measurement is being performed (step SF3 is YES), it is checked whether the GPS stop mode is set. If the GPS stop mode is not set (step SF12 is NO), time display in the clock mode is continued. When the GPS start mode is set but position measurement is not being performed (step SF3 is NO), the situation is checked by the tilt sensor 33 at intervals predetermined by the user (step SF4) and it is judged whether the tilt angle has continued to change during the specified period of time (step SF5). Such judgment is made based on multiple tilt angle data obtained by the measurements at predetermined intervals and have been successively stored in the RAM 7. If the tilt angle has not continued to change, the operation returns directly to step SF1, if the tilt angle has continued to change (step SF5 is YES), power is supplied to the GPS processing unit 3 to start position measurement (step SF6). That is, when the user starts to walk wearing the position measurement apparatus, it is detected by the continuous change of posture of the position measurement apparatus 31, and the GPS mode is automatically entered.

After the GPS mode is entered, in the same way as the steps SE7 to SE11 in the fifth embodiment, the previous measurement result as well as the simple map is displayed (steps SF7 to SF11). After the simple map is displayed by the above-mentioned procedure, or when either step SF2 or step SF3 is YES, and position measurement in the GPS mode is being performed, it is judged whether the GPS stop mode is set (step SF12). If the GPS stop mode is not set, the operation returns to SF1. If the GPS stop mode is set (step SF12 is YES), on the other hand, the situation is checked by the tilt sensor 33 at intervals of a specified period of time (step SF13), and it is judged whether the tilt angle has changed in the specified interval (step SF14). If the tilt angle has changed, the operation returns directly to step SF1, if the tilt angle remains constant (step SF14 is YES), power to the GPS processing unit 3 is disconnected ending the position measurement operation (step SF15). That is, when the user removes the position measurement apparatus 31, the posture of the position measurement apparatus 31, the posture of the position measurement apparatus does not change for a certain period of time. This is detected and the GPS mode is automatically canceled. Then the clock mode is entered (step SF16) and the operation returns to step SF1 repeating the above-mentioned procedure. During the above-mentioned operation, it is possible for the user to start or end position measurement in the GPS mode by the specified operations.

Therefore, in the position measurement apparatus 31 of this embodiment also, when the device is removed from the user, the GPS mode is automatically canceled ending the position measurement operation and eliminating the useless measurements while position measurement is not required. This results in a longer life of batteries and a smaller size of the device. Since position measurement automatically starts when worn by the user, nothing is required for the user to enter the GPS mode, which is convenient for the user.

As described in the fifth embodiment, it is also possible to provide only the GPS start mode wherein the device automatically starts position measurement when worn by the user. In such a case, the user is encouraged to cancel the GPS mode when removing the position measurement apparatus, resulting in a longer life of batteries and a smaller size of the device. When only the GPS start mode is provided, the GPS start mode may be used as the mode to start a single measurement that is performed by the user as required from time to time.

Although a device having single tilt sensor 33 for detecting the change of posture has been described in this embodiment, it is also possible to arrange a plurality of tilt sensors 33 so that tilt angles in different directions can be detected to detect the posture change of the device by the signals output from these sensors. The change of the posture can be more accurately detected in such constitution and the accuracy of operation in the GPS start mode and GPS stop mode increases in proportion to the number of sensors (number of directions). Although a device that starts or ends position measurement according to its posture change has been described, it is further possible to perform other operations such as changing the display on the LCD 51 of display circuit 5 or changing the scale of the simple map being displayed when a posture change in a specified direction is detected during position measurement in the GPS mode. This is convenient for the user because he or she does not need to operate switches to perform desired operations.

Embodiment 7

Figure 13:
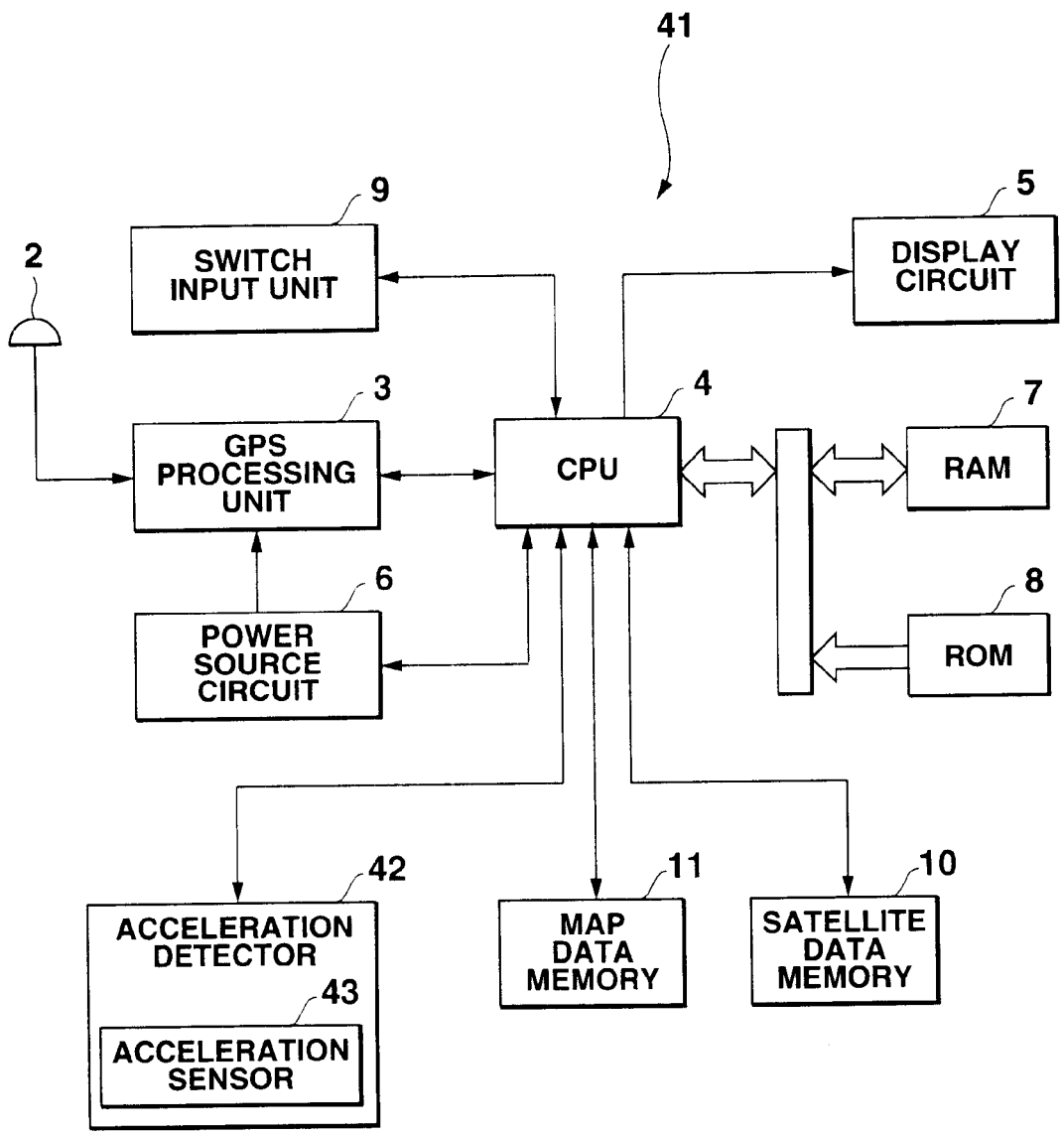
FIG. 13 a block diagram of position measurement apparatus of the seventh embodiment of the present invention.

Now the seventh embodiment of the present invention is described. FIG. 13 is a block diagram of a wristwatch-type position measurement apparatus 41 that can be fastened around the user's wrist in the same way as outlined in FIG. 1. Different features from the one shown in FIGURE are as follows. The position measurement apparatus 41 of this embodiment is provided with the function of pedometer for counting the number of steps, which has the acceleration detector 42 instead of the vibration detector 12, the acceleration detector having an acceleration sensor 43. The acceleration sensor 43 detects the acceleration of every step of the user or every vibration of the position measurement apparatus 41 and outputs electric signals as the position measurement apparatus vibrates. These signals from the acceleration sensor 43 are processed in the acceleration detector 42 and sent to the CPU 4 as walking signals. The number of steps is counted based on these walking signals. In addition to time and latitude/longitude, simple map of the present location can be displayed on the LCD 51 of the display circuit 5. Except for these features, the device is the same as illustrated in FIG. 1.

Figure 14:
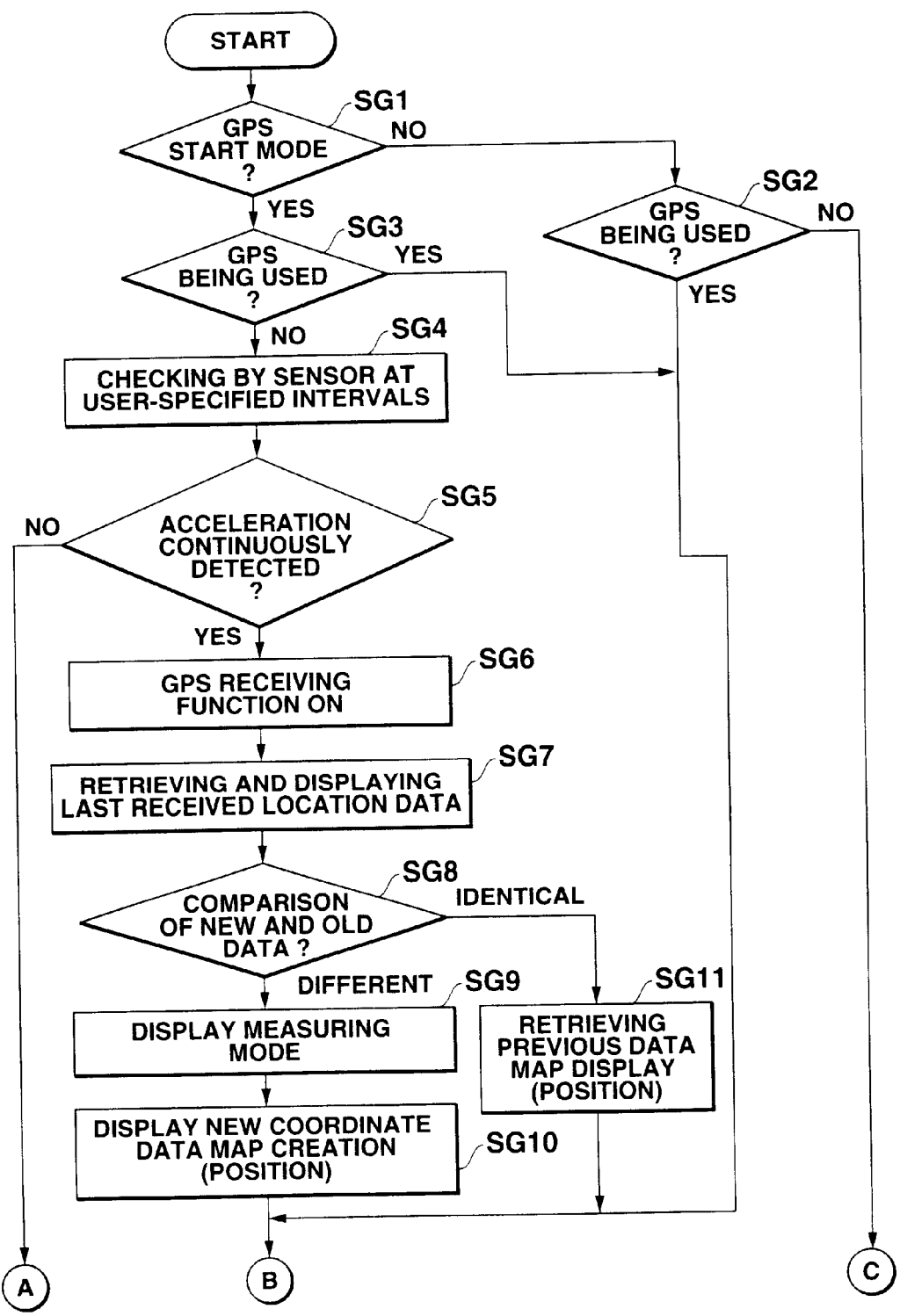
FIG. 14 is a flow chart showing the operation of the position measurement apparatus in the seventh embodiment of the present invention.
Figure 15:
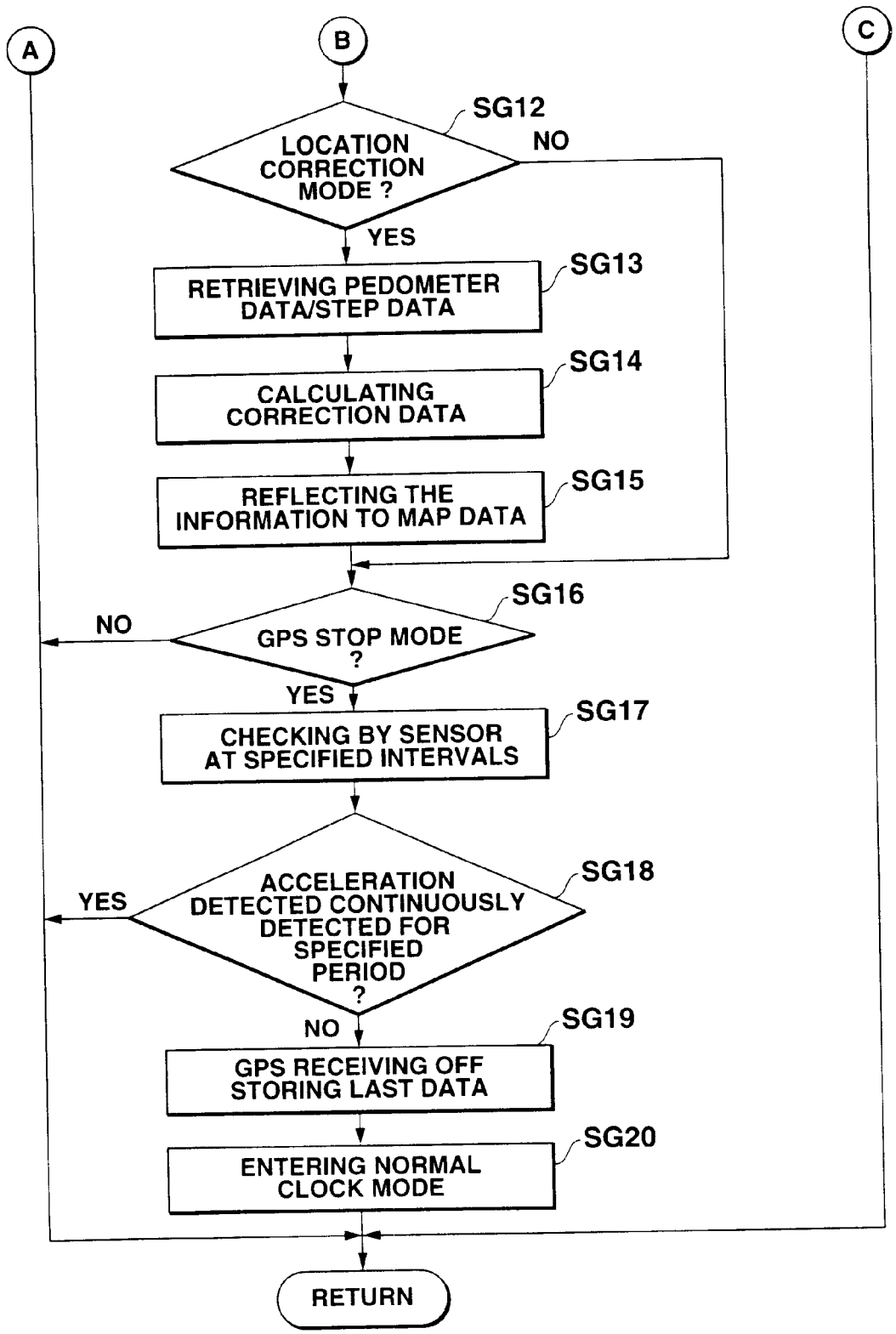
FIG. 15 is a flow chart continuing to the flow chart of FIG. 14.

In the same way ass described in the fifth and sixth embodiments, the position measurement apparatus is provided with the GPS mode wherein the present location is consecutively measured at intervals of a certain period of time (for example, 1 minute or 1 second) and the results are successively displayed, the GPS start mode that automatically sets the GPS mode, and the GPS stop mode that automatically ends the GPS mode. Further, the position measurement apparatus 41 is provided with the location correction mode wherein data of the user's step is stored in the RAM 7 and the present location is corrected based on the data of the user's step and the above-mentioned walking detection signals. These modes can be set or canceled by the user as required. The position measurement apparatus operates as illustrated in the flow chart of FIG. 14 and FIG. 15 with the CPU 4 controlling each unit based on the program stored in the ROM 8 according to the setting of the above-mentioned modes.

If neither the GPS start mode nor the GPS stop mode is set (both step SG1 and step SG2 are NO) and position measurement in the GPS mode is not being performed the existing situation (time display in the clock mode in this embodiment) is continued, if position measurement in the GPS mode is being performed (step SG1 is NO, step SG2 is YES, and step SG16 is NO), the position measurement operation is continued.

When the GPS start mode is set (step SG1 is YES), on the other hand, if position measurement is being performed (step SG3 is YES), it is judged whether the GPS stop mode is set. If the GPS stop mode is not set (step SG16 is NO), the time display in the clock mode is continued. If the GPS start mode is set and position measurement is not being made (step SG3 is NO), the situation is checked by the acceleration sensor 43 at intervals of a period predetermined by the user (step SG4) and it is judged whether acceleration has been detected consecutively (walking detection signals have output) during the predetermined period of time (step SG5). Such judgment is made by successively storing the time data when acceleration is detected together with the counted number of steps for each detection of acceleration in the RAM 7 as pedometer data (data for the specified period of time) and by judging whether the elapsed time since acceleration was detected last is within the specified period. If acceleration is not detected consecutively (acceleration is not detected during the preceding interval of the specified period), the operation directly returns to step SG1, if acceleration is consecutively detected (step 5 is YES), power is supplied to the GPS processing unit 3 to start the position measurement operation (step SG6). That is, when the user start to walk wearing the position measurement apparatus 41, it is detected that the position measurement apparatus is accelerated consecutively and the GPS mode is automatically entered.

After the GPS mode is entered, in the same way as steps SE7 to SE11 in the fifth and sixth embodiments, previous measurement result as well as MAP is displayed (steps SG7 to SG11). After displaying the simple map by the above-mentioned procedure, or when either SG2 or SG3 is YES and position measurement in the GPS mode is being performed, it is judged whether the location correction mode is set (step SG12). If the GPS mode has not been entered, the operation directly proceeds to step SG16, If the GPS mode has been entered, (step SG12 is YES), the above-mentioned pedometer and the step data specifically set for the user are retrieved from the RAM 7 in continuation (step SG13), and the correction data to correct the latest present location is calculated based on the both data. More specifically, the expected distance of movement from the previously measured location is calculated based on the distance of step and number of steps (step SG14); the present location determined by the latest measurement is corrected by the calculated correction data and the result is reflected on the coordinate data for the MAP display (step SG15). Position measurement of high accuracy is obtained by this procedure.

Then it is judged whether the GPS stop mode is set (step SG16). If the GPS mode is not set, the operation returns to step SG1. If the GPS stop mode is set (step SG16 is YES), the acceleration sensor 43 checks the situation at intervals of specified period of time (step SG17) and it is judged whether acceleration is detected consecutively within the specified intervals (step SG18). If acceleration is detected consecutively, the operation directly returns to step SG1, if acceleration is not detected consecutively, power to the GPS processing unit 3 is disconnected to end the position measurement operation (step SG19). That is, when the user removes the position measurement apparatus 41, it is detected that the position measurement apparatus does not vibrate for a certain period of time and the GPS mode is automatically canceled. Such operation is the same as described in the first embodiment referring to FIG. 2. After returning to the normal clock mode (step SG20), the operation returns to step SG1 and repeats the above-mentioned procedure. During these operations, the user can start or end position measurement in the GPS mode by the specified operations.

Therefore, in the position measurement apparatus 41 of this embodiment also, the GPS mode is canceled ending the position measurement operation when the user removes the device, eliminating useless measuring operation under such situation that position measurement is not required. This results in a longer life of batteries and a smaller size of the device. This device is convenient for the user since the position measurement operation in the GPS mode automatically starts without requiring the user's operation.

As described in the fifth and seventh embodiments, it is also possible to arrange the constitution so that position measurement automatically starts when the user wears the device but does not end automatically. In this constitution, useless measuring operation may be eliminated by encouraging the user to cancel the GPS mode when removing the position measurement apparatus 41. This results in a longer life of batteries when batteries are used for the power source and a smaller size of the device.

In the above-mentioned fifth to seventh embodiments, devices that automatically starts or ends position measurement operation based on the detection signals output by only one type of sensor such as thermo-sensor 23, tilt sensor 33, or acceleration sensor 43. However, if multiple types of sensors are provided (for example, thermo-sensor 23 and tilt sensor 33), position measurement can be started or ended based on the detection signals from different types of sensors. In such cases also, the same effect as described above can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable position measurement apparatus that can be worn by a user, said apparatus comprising:
    a position measurement unit that receives position measurement information transmitted from satellites, and that measures a present location based on the received information;
    a detection unit that detects whether or not the user is wearing the apparatus; and
    a control unit that ends measurement of the present location by said position measurement unit when said detection unit detects that the user is not wearing the apparatus.

2. The position measurement apparatus of claim 1, wherein said detection unit comprises a temperature detector that detects a temperature of a specified part of the apparatus, and said detection unit detects whether or not the user is wearing the apparatus based on a temperature change in a specified period of time.

3. The position measurement apparatus of claim 1, wherein said detection unit comprises a tilt angle detector that detects a posture of the apparatus, and said detection unit detects whether or not the user is wearing the apparatus based on whether or not the posture of the apparatus remains constant for a specified period of time.

4. A portable position measurement apparatus that can be worn by a user, said apparatus comprising:
    a position measurement unit that receives position measurement information transmitted from satellites, and that measures a present location based on the received information;
    a detection unit that detects whether or not the user is wearing the apparatus; and
    a control unit that starts measurement of the present location by said position measurement unit when said detection unit detects that the user is wearing the apparatus.

5. The position measurement apparatus of claim 4, wherein said detection unit comprises a temperature detector that detects a temperature of a specified part of the apparatus, and said detection unit detects whether or not the user is wearing the apparatus based on a temperature change in a specified period of time.

6. The position measurement apparatus of claim 4, wherein said detection unit comprises a tilt angle detector that detects a posture of the apparatus, and said detection unit detects whether or not the user is wearing the apparatus based on whether or not the posture of the apparatus remains constant for a specified period of time.

7. The position measurement apparatus of claim 4, wherein said detection unit comprises a vibration detector that detects vibration of the device, and said detection unit detects whether or not the user is wearing the apparatus based on whether a duration of vibration is shorter than a specified period of time.

* * * * *